(12) United States Patent
Wang et al.

(10) Patent No.: US 12,337,868 B2
(45) Date of Patent: Jun. 24, 2025

(54) SYSTEMS AND METHODS FOR SCENARIO DEPENDENT TRAJECTORY SCORING

(71) Applicant: Ford Global Technologies, LLC, Dearborn, MI (US)

(72) Inventors: Yuh-Shyang Wang, Pittsburgh, PA (US); Christopher Cunningham, Pittsburgh, PA (US); Nathaniel Honka, Mountain View, CA (US); Damir Mirkovic, Munich (DE)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 17/152,894

(22) Filed: Jan. 20, 2021

(65) Prior Publication Data

US 2022/0227391 A1    Jul. 21, 2022

(51) Int. Cl.
*G05D 1/02* (2020.01)
*B60W 40/04* (2006.01)
*B60W 40/06* (2012.01)
*B60W 40/09* (2012.01)
*B60W 50/14* (2020.01)
(Continued)

(52) U.S. Cl.
CPC ........ *B60W 60/0011* (2020.02); *B60W 40/04* (2013.01); *B60W 40/06* (2013.01); *B60W 2554/404* (2020.02)

(58) Field of Classification Search
None
See application file for complete search history.

(56) References Cited

U.S. PATENT DOCUMENTS

| 10,421,453 | B1 | 9/2019 | Ferguson et al. |
| 10,452,070 | B2 | 10/2019 | Greenfield et al. |
| 2019/0220016 | A1* | 7/2019 | Phillips ............... G05D 1/0088 |

(Continued)

FOREIGN PATENT DOCUMENTS

| KR | 102195935 B1 | 12/2020 |
| WO | 2020079066 A1 | 4/2020 |
| WO | 2020079066 A4 | 4/2020 |

OTHER PUBLICATIONS

Zhao, H., "TNT: Target-DriveN Trajecotry Prediction".
(Continued)

*Primary Examiner* — Adam D Tissot
*Assistant Examiner* — Michael T Silva
(74) *Attorney, Agent, or Firm* — Frank A. MacKenzie; Brooks Kushman, P.C.

(57) ABSTRACT

Systems and methods for operating an autonomous vehicle. The methods comprising: obtaining one or more candidate vehicle trajectories for the autonomous vehicle and context information defining a state of an environment surrounding the autonomous vehicle; assigning class(es) to a scenario specified by the context information and a first candidate vehicle trajectory; generating a first quality score for the first candidate vehicle trajectory using scoring function(s) selected based on the assigned class(es); select a candidate vehicle trajectory based on the first quality score associated with the first candidate vehicle trajectory and second quality score(s) associated with at least one second candidate vehicle trajectory; and causing the autonomous vehicle to perform autonomous driving operations using the selected candidate vehicle trajectory.

15 Claims, 8 Drawing Sheets

(51) Int. Cl.
   *B60W 60/00*   (2020.01)
   *G05D 1/00*   (2024.01)

(56) References Cited

U.S. PATENT DOCUMENTS

| | | | |
|---|---|---|---|
| 2019/0286151 A1* | 9/2019 | Palanisamy | G08G 1/096816 |
| 2019/0369637 A1 | 12/2019 | Shalev-Shwartz et al. | |
| 2021/0046924 A1* | 2/2021 | Caldwell | G06V 20/58 |
| 2021/0108936 A1* | 4/2021 | Seegmiller | B60W 60/0015 |
| 2021/0173402 A1* | 6/2021 | Chang | G05D 1/0221 |
| 2022/0048535 A1* | 2/2022 | Niendorf | B60W 60/0011 |
| 2022/0161786 A1* | 5/2022 | Javaid | B60W 30/0956 |
| 2022/0176995 A1* | 6/2022 | Subramanian | B60W 30/08 |

OTHER PUBLICATIONS

Fitzsimmons, E., "Development and Analysis of Vehicle Trajectories and Speed Profiles Along Horizontal Curves," Iowa State University, Ames Iowa, 2011.

Xue, Q. et al., "Rapid Driving Style Recognition in Car-Following Using Machine Learning and Vehicle Trajectory Data," Hindawi, Journal of Advanced Transportation, vol. 2019, Article ID 9085238, https://doi.org/10.1155/2019/9085238, pp. 1-11.

* cited by examiner

SYSTEMS AND METHODS FOR SCENARIO DEPENDENT TRAJECTORY SCORING

BACKGROUND

Statement of the Technical Field

The present disclosure relates generally to autonomous vehicles. More particularly, the present disclosure relates to implementing systems and methods for scenario dependent trajectory scoring.

Description of the Related Art

Modern day vehicles have at least one on-board computer and have internet/satellite connectivity. The software running on these on-board computers monitor and/or control operations of the vehicles. The software is configured to perform motion planning for a vehicle. The motion planning generally involves generating a trajectory for the vehicle based on processed and non-processed sensor data, and executing the generated trajectory.

SUMMARY

The present disclosure concerns implementing systems and methods for operating an autonomous vehicle. The methods comprise performing the following operations by a computing device (e.g., a vehicle on-board computing device): obtaining one or more candidate vehicle trajectories for the autonomous vehicle and context information defining a state of an environment surrounding the autonomous vehicle (e.g., intersection information, object related information, (e.g., observed sensor data for an object, prior knowledge of an object class, inferred properties of the object, predicted object trajectories), a road map, traffic information, and/or environmental information); assigning at least one class of a plurality of classes (e.g., a left turn scenario class, a right turn scenario, a passing scenario class, a driving scenario class, an acceleration scenario class, a deceleration scenario class, a stationary scenario class, a forward driving scenario class, a reverse driving scenario class, and/or a passenger pick-up scenario class) to a scenario specified by the context information and a first candidate vehicle trajectory of the candidate vehicle trajectories; selecting at least one scoring function from a plurality of different scoring functions based on the at least one class assigned to the scenario (the plurality of different scoring functions being respectively associated with the plurality of classes); generating at least one first quality score for the first candidate vehicle trajectory using the scoring function(s); selecting a candidate vehicle trajectory from the candidate vehicle trajectory based on the first quality score associated with the first candidate vehicle trajectory and a second quality score associated with at least one second candidate vehicle trajectory; and/or causing the autonomous vehicle to perform autonomous driving operations using the selected candidate vehicle trajectory (e.g., cause the autonomous vehicle to follow the selected candidate vehicle trajectory).

The computing device may also (i) generate a feature vector using the context information and a first candidate vehicle trajectory and (ii) use the feature vector to generate the quality score for the first candidate vehicle trajectory. The first quality score for the first candidate vehicle trajectory may be produced by combining two or more scores. For example, first and second classes are assigned to the scenario specified by the context information and a first candidate vehicle trajectory. A first scoring function is selected based on the first class. A second scoring function is selected based on the second class. The second scoring function is different than the first scoring function. A first score is generated using the first scoring function and a second score is generated using the second scoring function. The first score and the second score are combined together to produce the first quality score for the first candidate vehicle trajectory. The present solution is not limited to the particulars of this example.

In those or other scenarios, the computing device selects a set of scoring functions from a plurality of different sets or weights, based on the class assigned to the scenario. The selected set of scoring functions and/or weights is(are) used to generate the at least one first quality score for the first candidate vehicle trajectory. Additionally or alternatively, the candidate vehicle trajectory is selected from the candidate vehicle trajectories by comparing the first and second quality scores to each other or to a threshold value.

The implementing systems comprise: a processor; and a non-transitory computer-readable storage medium comprising programming instructions that are configured to cause the processor to implement the above described methods.

BRIEF DESCRIPTION OF THE DRAWINGS

The present solution will be described with reference to the following drawing figures, in which like numerals represent like items throughout the figures.

DETAILED DESCRIPTION

Figure 1:
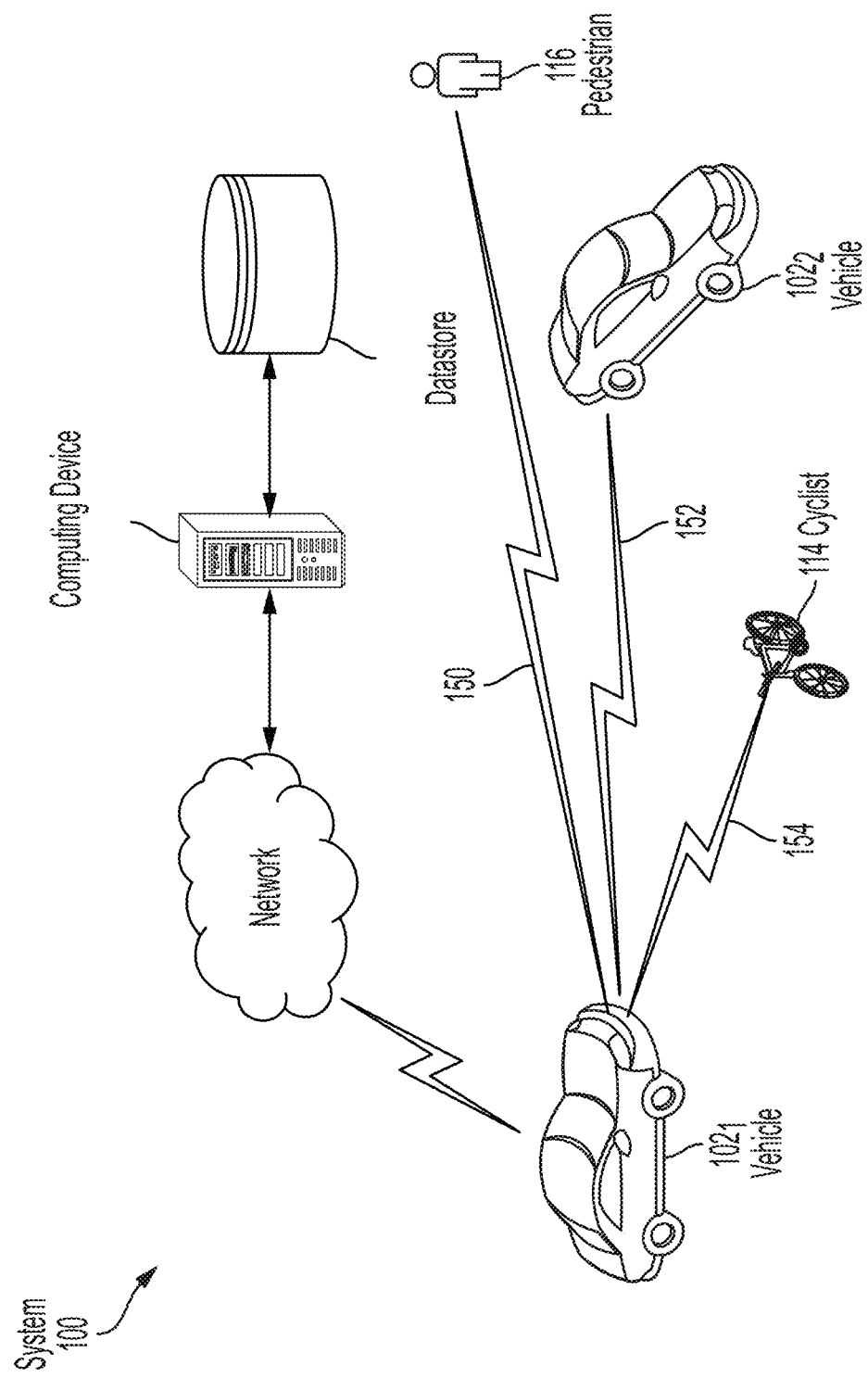
FIG. 1 is an illustration of an illustrative system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

An Autonomous Vehicle (AV) has at least one on-board computer and wireless communication connectivity. The software running on these on-board computers monitor and/or control operations of the vehicle. The software is configured to perform motion planning for the vehicle. The main task of motion planning is to generate a high quality trajectory for the AV to follow. For this goal, the on-board computer of the AV comprises a trajectory scoring module to evaluate the quality of multiple candidate trajectories based on a novel scoring scheme. The novel scoring scheme generally involves: determining a quality score for each candidate trajectory; and selecting the candidate trajectory with the best or most desirable quality score (e.g., the highest score, the lowest score, the score which exceeds a threshold value, or the score within or outside of boundary values).

The trajectory scoring module comprises a trajectory feature generator, a scenario classifier, scoring functions, and an aggregator. The trajectory feature generator is configured to analyze a candidate trajectory and context information to derive a feature vector. The context information includes, but is not limited to, intersection information, object related information (e.g., observed sensor data for an object, prior knowledge of an object class, inferred properties of the object, predicted object trajectories), a road map, traffic information and/or environmental information. The feature vector is then used to assign a score to the candidate trajectory. The feature vector helps to ensure that the solution works in different scenarios (e.g., when the AV is at an intersection, making a turn, driving straight, or driving close to a bicyclist). The scenario classifier is generally configured to classify given context information into at least one of a plurality of scenarios (e.g., track behind a lead vehicle, pass the object from the left, pass the object from the right, etc.). The context information generally defines a state of (e.g., circumstances and/or conditions) of an environment surrounding the autonomous vehicle. The scenario classification can be discrete or continuous. In the discrete case, the context information is classified as one of the plurality of scenarios. In the continuous case, a probability value is provided for each of a plurality of scenarios. Each scoring function is generally configured to generate a score for a candidate vehicle trajectory. The scoring function(s) can be the same as or different for each scenario classification. The aggregator is generally configured to aggregate the outputs from the scoring functions to produce the quality score for the given candidate trajectory.

The present solution is being described herein in the context of an autonomous vehicle. The present solution is not limited to autonomous vehicle applications. The present solution can be used in other applications such as robotic application, radar system application, metric applications, and/or system performance applications Illustrative Systems Referring now to FIG. 1, there is provided an illustration of an illustrative system 100. System 100 comprises a vehicle $102_1$ that is traveling along a road in a semi-autonomous or autonomous manner. Vehicle $102_1$ is also referred to herein as an AV. The AV $102_1$ can include, but is not limited to, a land vehicle (as shown in FIG. 1), an aircraft, a spacecraft or a watercraft.

AV $102_1$ is generally configured to detect objects $102_2$, 114, 116 in proximity thereto. The objects can include, but are not limited to, a vehicle $102_2$, a cyclist 114 (such as a rider of a bicycle, electric scooter, motorcycle, or the like) and/or a pedestrian 116. This object detection can be made, for example, by analyzing sensor data generated by at least one sensor device on the AV $102_1$ and/or information received from a communication device (e.g., a transceiver, a beacon and/or a smart phone) of the object via communication link(s) 150, 152, 154. The communication link(s) 150, 152, 154 can include, but are not limited to, V2X communication links. The term "V2X" refers to a communication between a vehicle an any entity that may affect, or may be affected by, the vehicle. The information can include, but is not limited to: information specifying actions or operations have been performed, being performed and/or are to be performed by the object; and/or information specifying future intentions of the object (e.g., a driving intention, a parking intention, a passenger pick-up intention, a delivery intention, etc.).

When such a detection is made, AV $102_1$ performs operations to: generate one or more possible object trajectories for the detected object; determine one or more object classifications, goals and/or future intentions for the detection object; and use the at least one of the generated possible object trajectories, object classifications, goals and future intentions to facilitate a determination of a vehicle trajectory. The AV $102_1$ may then perform operations to follow the vehicle trajectory.

In some scenarios, the AV $102_1$ performs additional operations to determine whether or not there is an undesirable level of risk that a collision will occur between the AV and object in a threshold period of time (e.g., 1 minute). If so, the AV $102_1$ performs operations to determine whether the collision can be avoided if the vehicle trajectory is followed by the AV $102_1$ and any one of a plurality of dynamically generated emergency maneuvers is performed in pre-defined time period (e.g., N milliseconds). If the collision can be avoided, then the AV $102_1$ takes no action or optionally performs a cautious maneuver (e.g., mildly slows down). In contrast, if the collision cannot be avoided, then the AV $102_1$ immediately takes an emergency maneuver (e.g., brakes and/or changes direction of travel).

Figure 2:
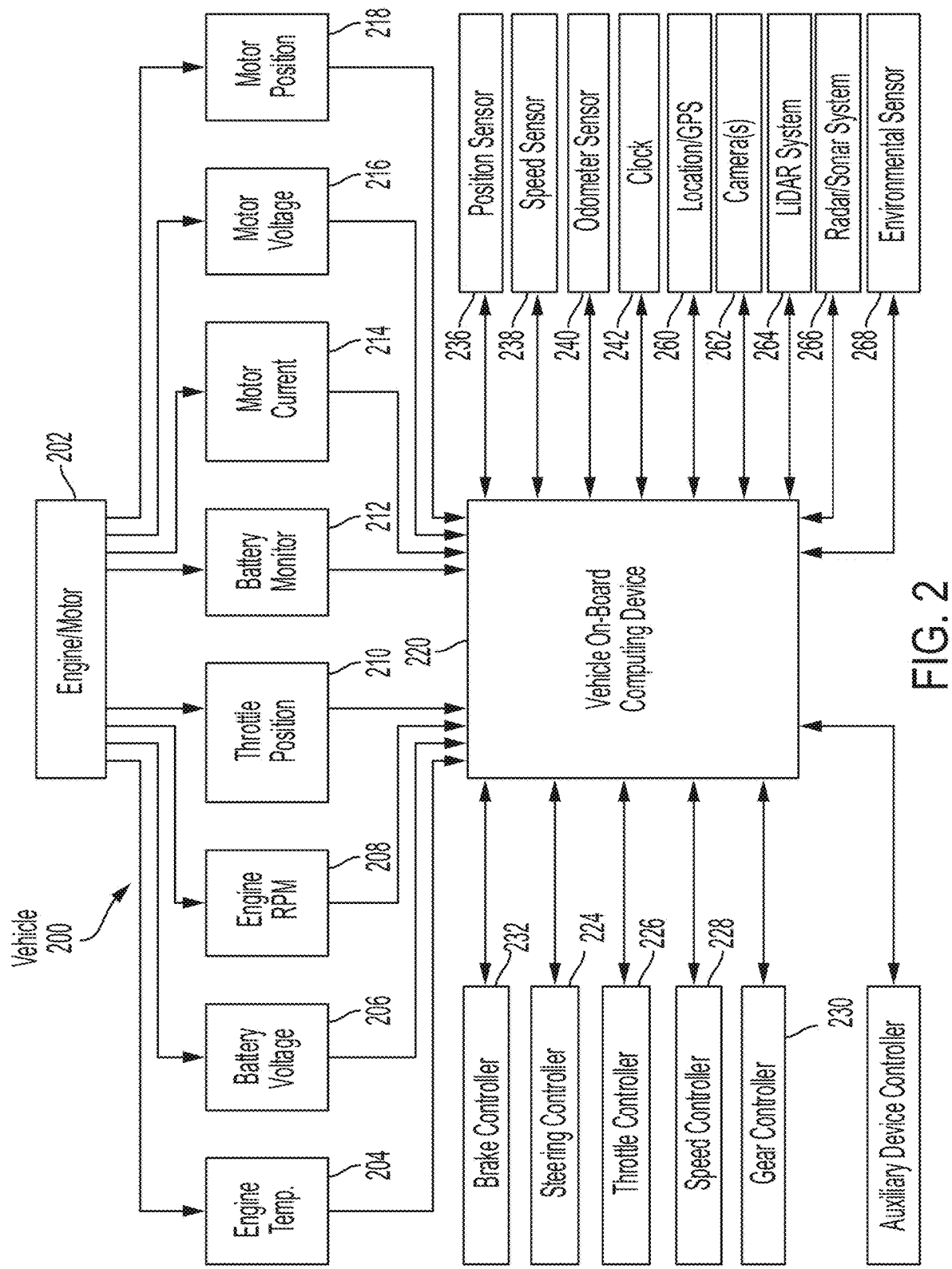
FIG. 2 is an illustration of an illustrative architecture for a vehicle.

Referring now to FIG. 2, there is provided an illustration of an illustrative system architecture 200 for a vehicle. Vehicles $102_1$ and/or $102_2$ of FIG. 1 can have the same or similar system architecture as that shown in FIG. 2. Thus, the following discussion of system architecture 200 is sufficient for understanding vehicle(s) $102_1$, $102_2$ of FIG. 1.

As shown in FIG. 2, the vehicle 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 (e.g., a Global Positioning System (GPS) device); object detection sensors such as one or more cameras 262; a LiDAR sensor system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to an on-board computing device 220. The on-board computing device 220 analyzes the data captured by the sensors and optionally controls operations of the vehicle based on results of the analysis. For example, the on-board computing device 220 may control: braking via a brake controller 232; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as LiDAR 264 is communicated from those sensors to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

LiDAR information is communicated from LiDAR sensor 264 to the on-board computing device 220. Additionally, captured images are communicated from the camera(s) 262 to the on-board computing device 220. The LiDAR information and/or captured images are processed by the on-board computing device 220 to detect objects in proximity to the vehicle 200.

When the on-board computing device 220 detects a moving object, the on-board computing device 220 will generate one or more possible object trajectories for the detected object, and use the possible object trajectories to determine a vehicle trajectory for the AV. The on-board computing device 220 then performs operations to cause the AV to follow the defined vehicle trajectory. For example, the on-board computing device 220 uses the object trajectory information to decide what space has been occupied by the object, and then generates a vehicle trajectory in which the AV is not planned to travel to that space.

In some scenarios, the on-board computing device 220 analyzes the possible object trajectories and the vehicle trajectory to assess the risk of a collision between the object and the AV. If the risk exceeds an acceptable threshold, the on-board computing device 220 performs operations to determine whether the collision can be avoided if the AV follows a vehicle trajectory and/or implements one or more dynamically generated emergency maneuvers is performed in a pre-defined time period (e.g., N milliseconds). If the collision can be avoided, then the on-board computing device 220 may cause the vehicle 200 to perform a cautious maneuver (e.g., mildly slow down, accelerate, or swerve). In contrast, if the collision cannot be avoided, then the on-board computing device 220 will cause the vehicle 200 to take an emergency maneuver (e.g., brake and/or change direction of travel).

Figure 3:
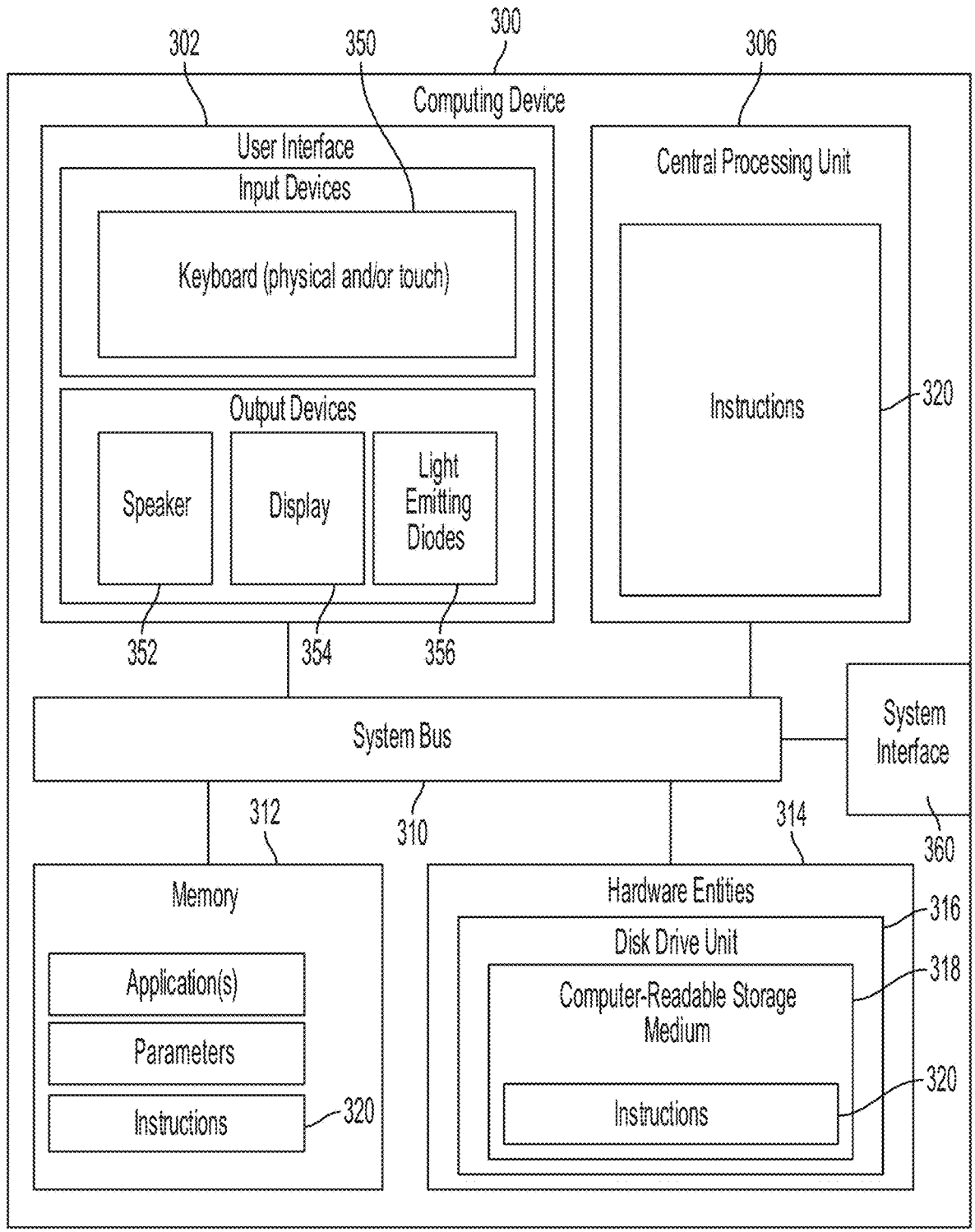
FIG. 3 is an illustration of an illustrative computing device.

Referring now to FIG. 3, there is provided an illustration of an illustrative architecture for a computing device 300. The computing device 110 of FIG. 1 and/or the vehicle on-board computing device 220 of FIG. 2 is/are the same as or similar to computing device 300. As such, the discussion of computing device 300 is sufficient for understanding the computing device 110 of FIG. 1 and the vehicle on-board computing device 220 of FIG. 2.

Computing device 300 may include more or less components than those shown in FIG. 3. However, the components shown are sufficient to disclose an illustrative solution implementing the present solution. The hardware architecture of FIG. 3 represents one implementation of a representative computing device configured to operate a vehicle, as described herein. As such, the computing device 300 of FIG. 3 implements at least a portion of the method(s) described herein.

Some or all components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit (CPU) 306, a system bus 310, a memory 312 connected to and accessible by other portions of computing device 300 through system bus 310, a system interface 360, and hardware entities 314 connected to system bus 310. The user interface can include input devices and output devices, which facilitate user-software interactions for controlling operations of the computing device 300. The input devices include, but are not limited to, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356. System interface 360 is configured to facilitate wired or wireless communications to and from external devices (e.g., network nodes such as access points, etc.).

At least some of the hardware entities 314 perform actions involving access to and use of memory 312, which can be a Random Access Memory (RAM), a disk drive, flash memory, a Compact Disc Read Only Memory (CD-ROM) and/or another hardware device that is capable of storing instructions and data. Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Figure 4:
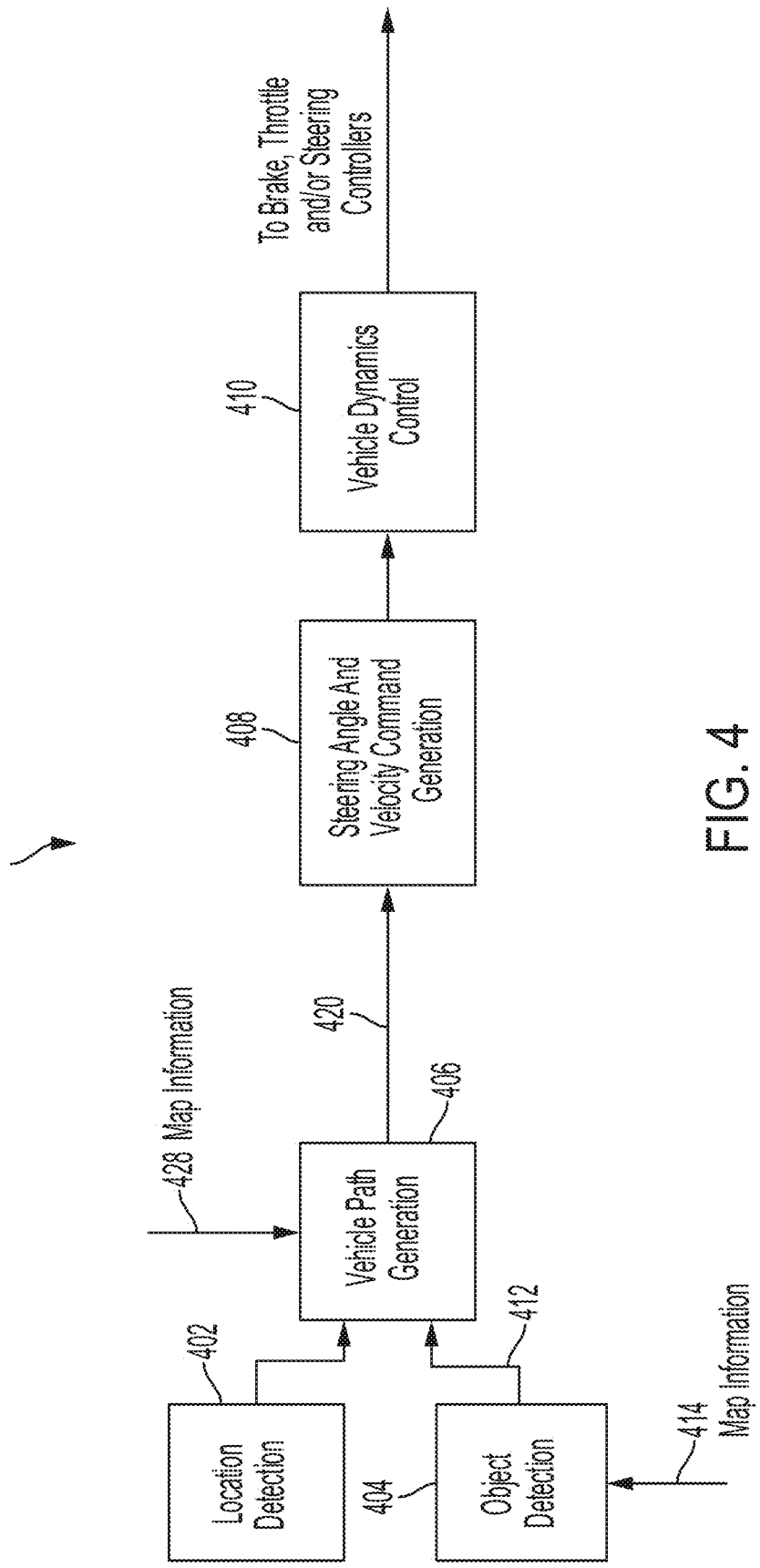
FIG. 4 provides a block diagram of an illustrative vehicle trajectory planning process.

Referring now to FIG. 4, there is provided a block diagram that is useful for understanding how movement of an AV is achieved in accordance with the present solution. All of the operations performed in blocks 402-410 can be performed by the on-board computing device of a vehicle (e.g., AV $102_1$ of FIG. 1).

In block 402, a location of the AV (e.g., AV $102_1$ of FIG. 1) is detected. This detection can be made based on sensor data output from a location sensor (e.g., location sensor 260 of FIG. 2) of the AV. This sensor data can include, but is not limited to, GPS data. The detected location of the AV is then passed to block 406.

In block 404, an object (e.g., vehicle $102_2$ of FIG. 1) is detected within proximity of the AV (e.g., <100+ meters). This detection is made based on sensor data output from a camera (e.g., camera 262 of FIG. 2) of the AV, a LiDAR system (e.g., LiDAR system 264 of FIG. 2) of the AV, and/or a radar/sonar system (e.g., radar/sonar system 266 of FIG. 2) of the AV. For example, image processing is performed to detect an instance of an object of a certain class (e.g., a vehicle or pedestrian) in an image. LiDAR point clouds can additionally or alternatively be analyzed to detect the object of the certain class. Track information generated by the radar/sonar system can additionally or alternatively be used to detect the object. The sensor data (e.g., images, LiDAR point clouds and radar/sonar data) processing/object detection can be achieved in accordance with any known or to be known image processing/object detection algorithm.

Additionally, a predicted trajectory is determined in block 404 for the object. The object's trajectory is predicted in block 404 based on, for example, the object's class, a cuboid geometry, radar track information and/or contents of a map 414 (e.g., sidewalk locations, lane locations, lane directions of travel, driving rules, etc.). The cuboid geometry may be determined using a LiDAR dataset and the map 414. Techniques for predicting object trajectories based on cuboid geometries and/or the other listed information are well known in the art. For example, one technique involves predicting that the object is moving on a linear path in the same direction as the heading direction of the cuboid. The predicted object trajectories can include, but are not limited to, the following trajectories: a trajectory defined by the object's actual speed (e.g., 1 mile per hour) and actual direction of travel (e.g., west); a trajectory defined by the object's actual speed (e.g., 1 mile per hour) and another possible direction of travel (e.g., south, south-west, or X (e.g., 40°) degrees from the object's actual direction of travel in a direction towards the AV) for the object; a trajectory defined by another possible speed for the object (e.g., 2-10 miles per hour) and the object's actual direction of travel (e.g., west); and/or a trajectory defined by another possible speed for the object (e.g., 2-10 miles per hour) and another possible direction of travel (e.g., south, south-west, or X (e.g., 40°) degrees from the object's actual direction of travel in a direction towards the AV) for the object. The possible speed(s) and/or possible direction(s) of travel may be pre-defined for objects in the same class and/or sub-class as the object. The cuboid defines a full extent of the object and a heading of the object. The heading defines a direction in which the object's front is pointed, and therefore provides an indication as to the actual and/or possible direction of travel for the object.

Information 412 specifying the object's predicted trajectory and/or the cuboid geometry is provided to block 406. In some scenarios, a classification of the object is also passed to block 406. In block 406, a high quality vehicle trajectory 420 is generated using the information from blocks 402 and 404. The high quality vehicle trajectory is selected from a plurality of candidate vehicle trajectories. Techniques for determining candidate vehicle trajectories are well known in the art. For example, in some scenarios, such a technique involves determining a candidate trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. Each candidate vehicle trajectory can be determined based on the location information from block 402, the object detection information from block 404, and/or map information 428 (which is pre-stored in a data store of the vehicle). A quality score is determined for each candidate vehicle trajectory. The candidate vehicle trajectory with the best or most desirable quality score (e.g., the highest score, the lowest score, or the score which exceeds a threshold value) is then selected as the high quality vehicle trajectory 420.

The manner in which the candidate vehicle trajectories are scored and/or selected will be described in more detail below.

The high quality vehicle trajectory 420 may represent a smooth path that does not have abrupt changes that would otherwise provide passenger discomfort. For example, the vehicle trajectory is defined by a path of travel along a given lane of a road in which the object is not predicted travel within a given amount of time. The high quality vehicle trajectory 420 is then provided to block 408.

In block 408, a steering angle and velocity command is generated based on the vehicle trajectory 420. The steering angle and velocity command is provided to block 410 for vehicle dynamics control, i.e., the steering angle and velocity command causes the AV to follow the vehicle trajectory 420.

Illustrative Methods

Referring now to FIG. 5, there is provided a flow diagram of an illustrative method 500 for operating a vehicle (e.g., vehicle $102_1$ of FIG. 1). Method 500 can be implemented by the vehicle on-board computing device 220 of FIG. 2 and/or the computing device 300 of FIG. 3. Method 500 is performed for each object (e.g., vehicle $102_2$ of FIG. 1, cyclist 114 of FIG. 1, and/or pedestrian 116 of FIG. 1) that has been detected to be within a distance range from the vehicle at any given time.

Figure 5A:
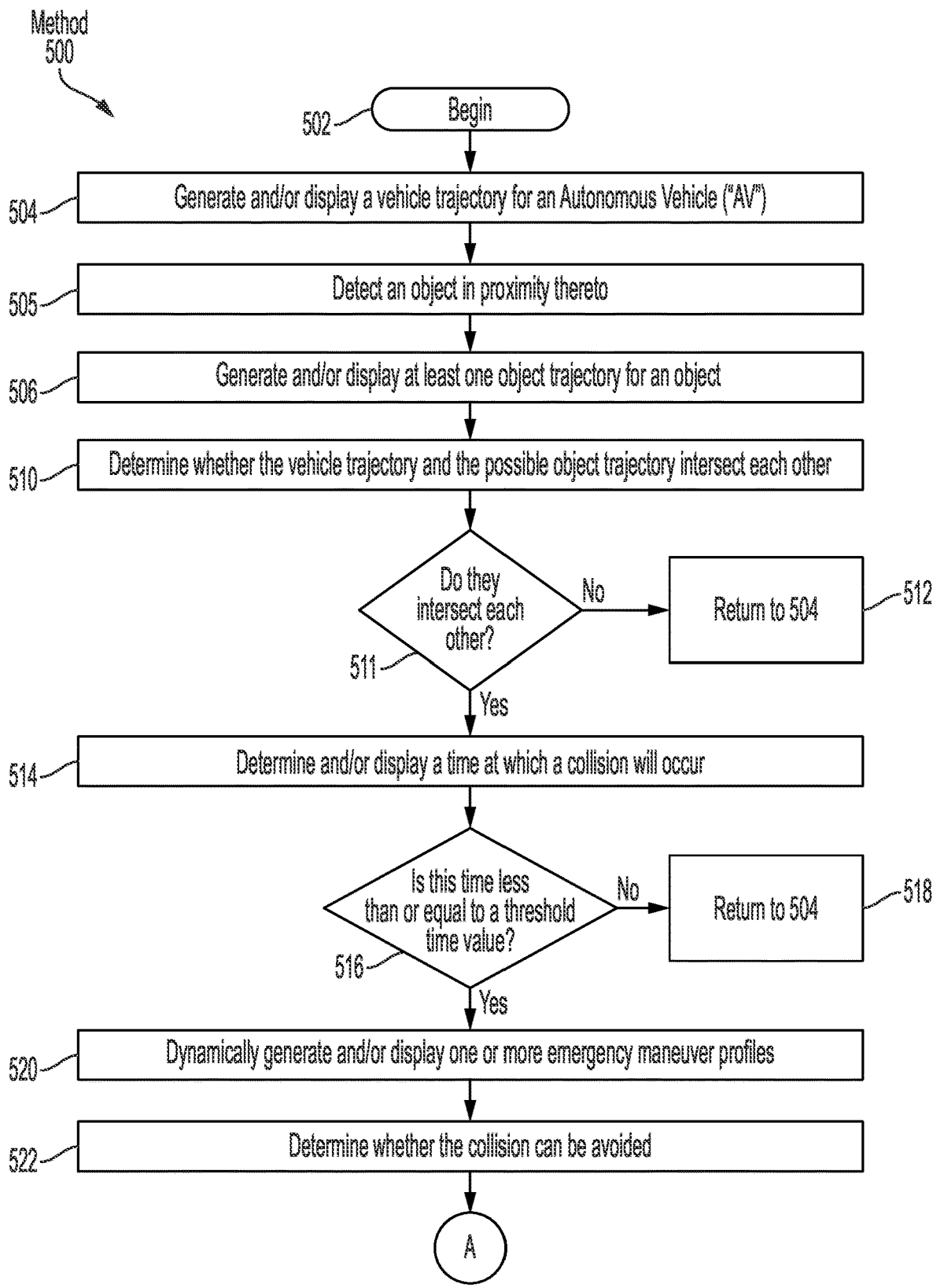
FIGS. 5A-5B (collectively referred to herein as "FIG. 5") provides a flow diagram of an illustrative method for operating a vehicle.

Method 500 comprises a plurality of operations 502-530. The present solution is not limited to the particular order of operations 502-530 shown in FIG. 5. For example, the operations of 504 can be performed subsequent to 506, rather than before as shown in FIG. 5A. Additionally or alternatively, the operations of 520 can be performed in parallel with the operations of 504-518, rather than subsequent to the same as shown in FIG. 5.

As shown in FIG. 5A, method 500 begins with 502 and continues with 504 where a high quality vehicle trajectory (e.g., vehicle trajectory 420 of FIG. 4) for an AV is generated. The manner in which the high quality vehicle trajectory is generated will be described below in relation to FIG. 6. The high quality vehicle trajectory may represent a smooth path that does not have abrupt changes that would otherwise provide passenger discomfort, or may repent an emergency maneuver to avoid a collision. In some scenarios, the high quality vehicle trajectory is determined based on location information generated by a location sensor (e.g., location sensor 260 of FIG. 2) of the AV, object detection information generated by the on-board computing device (e.g., on-board computing device 220 of FIG. 2) of the AV, images captured by at least one camera (e.g., camera 262 of FIG. 2) of the AV, LiDAR datasets generated by a LiDAR system (e.g., LiDAR system 264 of FIG. 2) of the AV, radar/sonar data generated by a radar/sonar system (e.g., radar/sonar system 266 of FIG. 2) of the AV, map information stored in a memory (e.g., memory 312 of FIG. 3) of the AV, and/or lane information.

In 505, the AV performs operations to detect an object that is in proximity thereto. Object detection algorithms are well known in the art. Any known or to be known object detection algorithm can be used here. The object detection is then used to facilitate at least one autonomous driving operation (e.g., object tracking operations, object trajectory prediction operations, vehicle trajectory determination operations, and/or collision avoidance operations).

Accordingly, method 500 continues with 506 where one or more possible object trajectories (e.g., possible object trajectories 412 of FIG. 4) are determined for the object (e.g., vehicle $102_2$, cyclist 114 or pedestrian 116 of FIG. 1) detected in 505. Techniques for determining trajectories for detected objects are well known. In some scenarios, sensor data is used to determine the object trajectories. Other information may be alternatively or additionally used to determine the object trajectories. This other information can include, but is not limited to, information received from a communication device (e.g., a transceiver, a beacon and/or a smart phone) of the object via wireless communication link(s) (e.g., link(s) 150, 152, 154 of FIG. 1). This information can specify actions or operations that have been performed, are being performed and/or are going to be performed by the object. (e.g., turn right/left, change lanes, accelerate/decelerate, a path of travel, etc.).

Next in 510, a determination is made as to whether the vehicle trajectory generated in 504 and the possible object trajectory generated in 506 intersect each other. If they do not intersect each other [511: NO], then 512 is performed where method 500 returns to 504.

In contrast, if they do intersect each other [511: YES], then method 500 continues to 514 where a time value is determined. This time value represents a time at which a collision will occur if the high quality vehicle trajectory is followed by the AV and the possible object trajectory of travel is followed by the object (e.g., which has been classified as a driving vehicle and has a drive intention). The time value determined in 514 is then compared to a threshold time value, as shown by 516. The threshold time value is selected in accordance with a given application (e.g., one or more seconds). If the time value is greater than the threshold time value [516: NO], then 518 is performed where method 500 returns to 504. If the time value is equal to or less than the threshold time value [516: YES], then method 500 continues with 520-522. 520-522 involve: dynamically generating one or more emergency maneuver profiles based on the high quality vehicle trajectory and the possible object trajectory/predicted path of travel; and determine whether the collision can be avoided if the high quality vehicle trajectory is followed by the AV and any one of the emergency maneuvers is performed in a pre-defined time period (e.g., N milliseconds). Upon completing 522, method 500 continues with 524 of FIG. 5B.

Figure 5B:
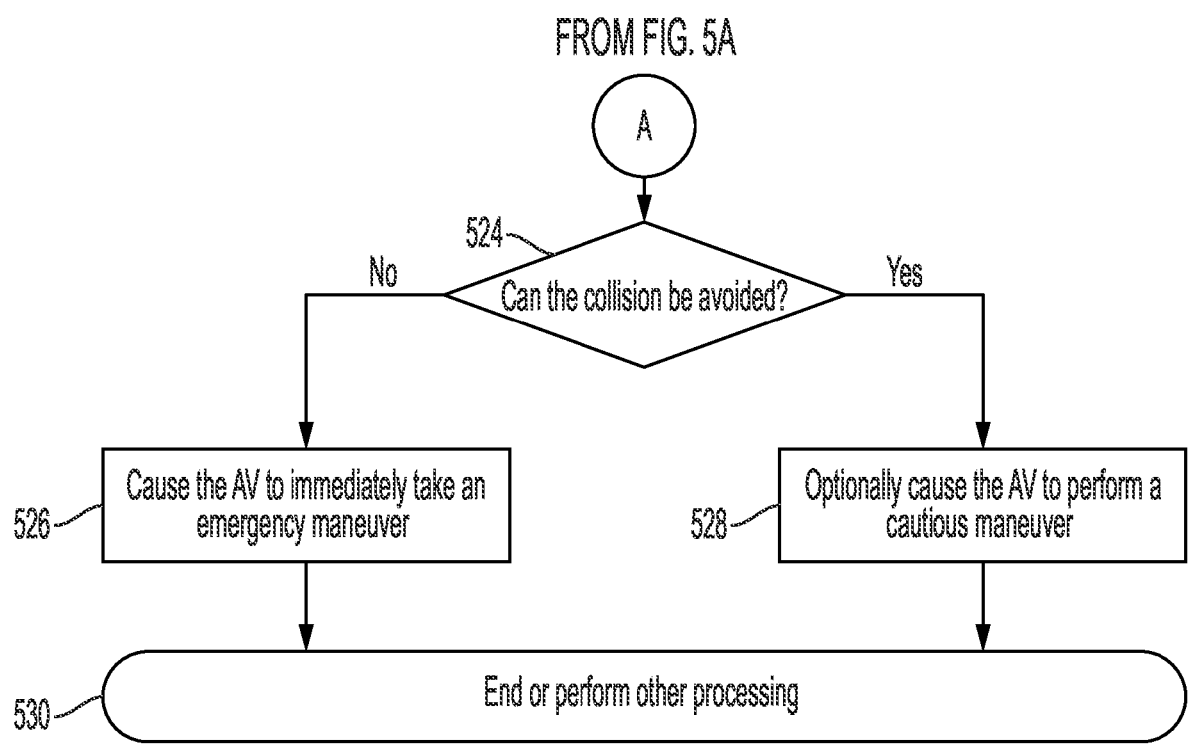

Referring now to FIG. 5B, if the collision cannot be avoided in the pre-defined time period [524: NO], then 526 is performed where the AV is caused to immediately take an emergency maneuver. The emergency maneuver can include, but is not limited to, one of the dynamically generated emergency maneuvers discussed above in relation to 520. Techniques for causing an AV to take emergency maneuvers are well known in the art. Subsequently, 530 is performed where method 500 ends or other processing is performed.

In contrast, if the collision can be avoided in the pre-defined time period [524: YES], then 528 is performed where the AV is optionally caused to perform a cautious maneuver (e.g., mildly slow down). Techniques for causing an AV to take a cautious maneuver such as slowing down are well known in the art. Subsequently, 530 is performed where method 500 ends or other processing is performed.

Figure 6:
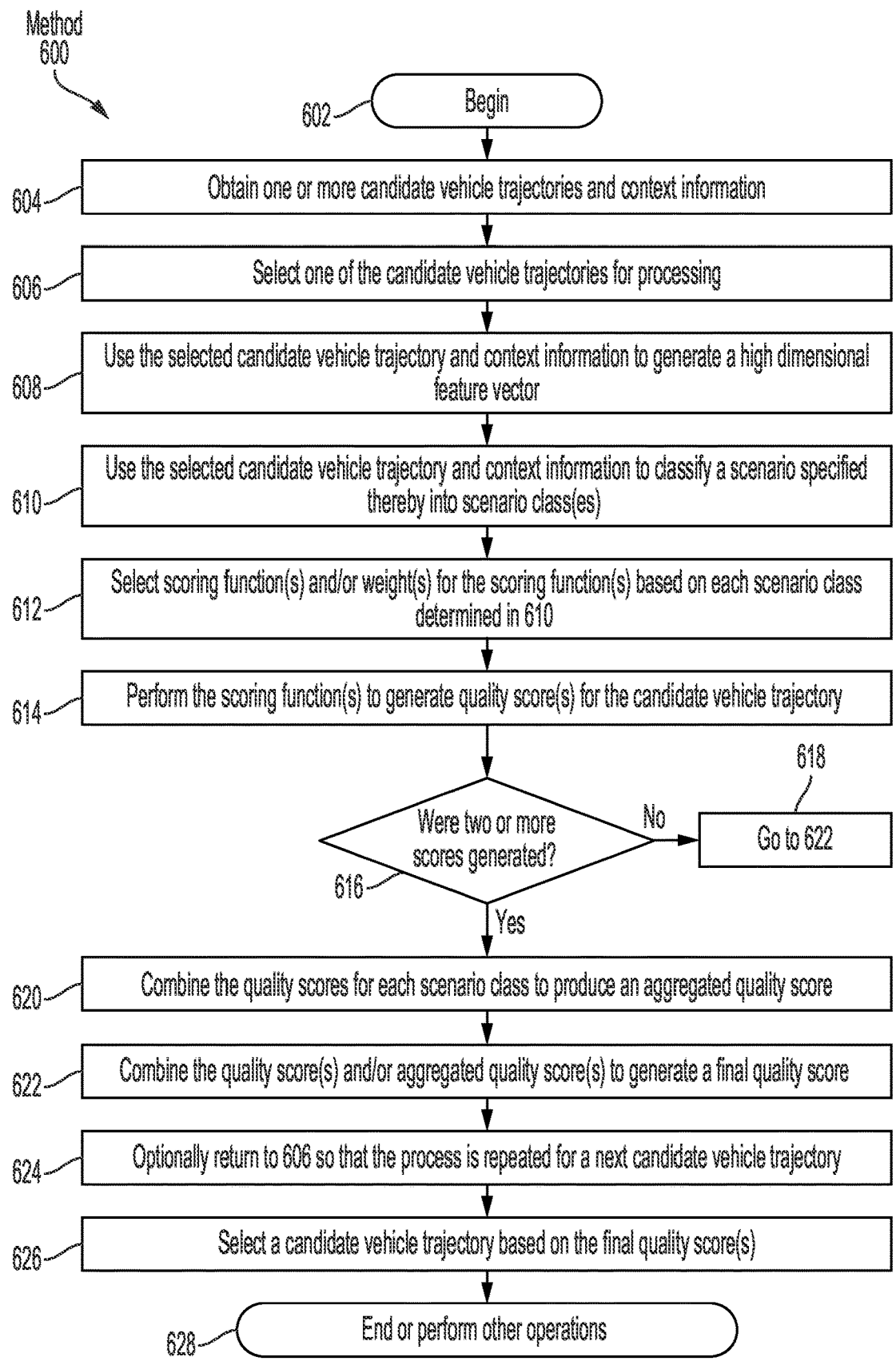
FIG. 6 provides a flow diagram of an illustrative method generating a high quality vehicle trajectory in accordance with the present solution.

Referring now to FIG. 6, there is provided a flow diagram of an illustrative method 600 generating a high quality vehicle trajectory in accordance with the present solution. Method 600 can be performed in block 406 of FIG. 4 and/or block 504 of FIG. 5. Method 600 can be implemented by the vehicle on-board computing device 220 of FIG. 2 and/or the computing device 300 of FIG. 3.

As shown in FIG. 6, method 600 begins with 602 and continues with 604 where the computing device obtains candidate vehicle trajectory(ies) and context information from a data store (e.g., memory 312 of FIG. 3). The context information generally defines circumstances and/or conditions of an environment surrounding the autonomous vehicle. The context information can include, but is not limited to, predicted trajectories for detected objects, a map (e.g., 3D road map), traffic information (e.g., traffic flow, traffic jams, slow moving, delays, road closure, roadwork, construction, accident, etc.), environmental information (e.g., rain, snow, fog, etc.), and/or other information (e.g., information received over communication link(s) 150, 152, 154 of FIG. 1). A candidate vehicle trajectory is selected in 606. The selected candidate vehicle trajectory and the context information is used in 608 to generate a feature vector.

The feature vector is determined using known or to be known geometric algorithms, deep learning techniques (e.g., variational auto encoder), and/or other feature extraction algorithms. The feature vector can include, but is not limited to, a value specifying the closest detected object (e.g., pedestrian) to the vehicle, the closest distance from detected object (e.g., light, stop sign, etc.) to the vehicle, and/or whether the vehicle is blocking an intersection. The feature vector may also include, but is not limited to, the following information for a detected object: a foreground/background classification, a position, and a delta value (i.e., height above ground).

The selected candidate vehicle trajectory and the context information is also used in 610 to classify a scenario specified thereby into one or more scenario classes. The scenario classification can be discrete or continuous. In the discrete case, the context is classified as one of the scenarios. In the continuous case, the scenario classifier given a probability of each possible scenario. The scenario space itself can be discrete or continuous. In the discrete case, there are a finite number of scenario. In the continuous case, the scenario space is a multi-dimensional vector space where each scenario is represented by a multi-dimensional real-valued vector.

The scenario classes can include, but are not limited to, a left turn scenario class, a right turn scenario, a passing scenario class, a driving scenario class, an acceleration scenario class, a deceleration scenario class, a stationary scenario class, a forward driving scenario class, a reverse driving scenario class, and/or a passenger pick-up scenario class. In some scenarios, a machine learning algorithm is employed in which machine learned models are used to determine scenario classifications. In those or other scenarios, the classification criteria is pre-defined to specify possible scenario classifications. For example, if the select candidate vehicle trajectory and map of the context information indicate that the AV is to take a left or right turn, then the scenario may be classified as a left or right turn scenario. If the selected candidate vehicle trajectory, a predicted trajectory for a detected object, road map and traffic information indicate that the AV is to pass the detected object, then the scenario may be classified as a passing scenario. If the selected candidate vehicle trajectory indicates that the AV is stationary and the context information indicates that individual(s) is(are) in proximity to the AV, then the scenario may be classified as a passenger pick-up scenario. The present solution is not limited to the particulars of this example.

The machine-learning algorithm can employ supervised machine learning, semi-supervised machine learning, unsupervised machine learning, and/or reinforcement machine learning. Each of these listed types of machine-learning algorithms is well known in the art. In some scenarios, the machine-learning algorithm includes, but is not limited to, a decision tree learning algorithm, an association rule learning algorithm, an artificial neural network learning algorithm, a deep learning algorithm, an inductive logic programming based algorithm, a support vector machine based algorithm, a Bayesian network based algorithm, a representation learning algorithm, a similarity and metric learning algorithm, a sparse dictionary learning algorithm, a genetic algorithm, a rule-based machine-learning algorithm, and/or a learning classifier system based algorithm. The machine-learning process implemented by the present solution can be built using Commercial-Off-The-Shelf (COTS) tools (e.g., SAS available from SAS Institute Inc. of Cary, North Carolina).

For each scenario class determined in 610, the computing device selects in 612 (i) a scoring function from a plurality of different scoring functions $SF_1, SF_2, \ldots, SF_N$, (ii) a set of scoring functions from a plurality of different sets (e.g., $ST_1=[SF_1, SF_2, SF_{10}]$, $ST_2=[SF_2, SF_5, SF_{10}, SF_N]$ and/or $ST_3=[SF_6, SF_8]$), and/or (iii) weights $w_Z$ for the at least one scoring function. N and Z are integers. The scoring functions can include, but are not limited to, a linear regression function, a non-linear regression function, a Quadratic function features in feature vector, and/or a polynomial function of features in feature vector. An illustrative scoring function SF(f) is defined by the following mathematical equation (2).

$$SF(f) = w \cdot f \qquad (2)$$

where SF(f) is the inner product of the feature vector f and a weight w of the associated scenario.

The scoring function(s) is(are) performed in 614 to generate quality score(s) $s_x$ for the candidate vehicle trajectory. X is an integer. One or more quality scores can be generated for each scenario class associated with the candidate vehicle trajectory. For example, a first quality score $s_1$ is generated for a first scenario class (e.g., a right turn scenario class) determined in 610 for the candidate vehicle trajectory. A second quality score $s_2$ and a third quality score $s_3$ are generated for a second scenario class (e.g., a passenger pick-up scenario class) determined in 610 for the candidate vehicle trajectory. The present solution is not limited to the particulars of this example.

If only one quality score was generated for all of the scenario classes [616: NO], then method 600 continues with 622 as shown by 618. In 622, the quality scores for all the scenario classes are combined together to produce a final quality score $s_{final}$. The final quality score $s_{final}$ may be defined, for example, by the following mathematical equation (3), mathematical equation (4) or mathematical equation (5).

$$s_{final} = s_{1\text{-}class1} + s_{2\text{-}class2} + \ldots + s_{X\text{-}classX} \qquad (3)$$

$$s_{final} = avg(s_{1\text{-}class1} + s_{2\text{-}class2} + \ldots + s_{X\text{-}classX}) \qquad (4)$$

$$s_{final} = (w_1 \cdot s_{1\text{-}class1}) + (w_2 \cdot s_{2\text{-}class2}) + \ldots + (w_X \cdot s_{X\text{-}classX}) \qquad (5)$$

where $s_{1\text{-}class1}$ represents a quality score generated for a first scenario class, $s_{1\text{-}class2}$ represents a quality score generated for a second scenario class, $s_{X\text{-}classX}$ represents a quality score generated for the $X^{th}$ scenario class, and $w_1, w_2, \ldots, w_X$ each represent a weight.

If two or more quality scores were generated for at least one scenario class [616: YES], then method 600 continues with 620 where the quality scores are combined together to produce an aggregate quality score $s_{aggregate}$ for the given scenario class. For example, if two quality scores $s_{1\text{-}class1}$ and $s_{2\text{-}class2}$ where generated for a given class X, then the aggregate quality score for the given class may be defined by the following mathematical equation (5), mathematical equation (6), mathematical equation (7) or mathematical equation (8).

$$s_{aggregate-classX} = s_{1-classX} + s_{2-classX} \quad (5)$$

$$s_{aggregate-classX} = \text{avg}(s_{1-classX} + s_{2-classX}) \quad (6)$$

$$s_{aggregate-classX} = (w_1 \cdot s_{1-classX}) + (w_1 \cdot s_{2-classX}) \quad (7)$$

$$s_{aggregate-classX} = s_{1-classX} + s_{2-classX} + s_{classX-previous} \quad (8)$$

where $s_{classX-previous}$ represents a previous quality score generated for the given class. The present solution is not limited to the particulars of these mathematical equations. The aggregation function can be a (weighted) average, max out, or any other real-valued vector function. The aggregation function can be static or dynamic. The dynamic aggregation functions can include, but is not limited to, filtering and other smoothing functions to smooth the transition between different scenarios, and/or a function of any historical values of the quality score (e.g., the quality score calculated in previous cycle(s) or a certain amount of time ago).

The aggregated quality score may be combined with the quality score(s)/aggregate quality score(s) for the other scenario classes to generate the final quality score $s_{final}$ for the given candidate vehicle trajectory, as shown by 622. Accordingly, the final quality score $s_{final}$ may be alternatively defined by the following mathematical equation (8), (9), (10), (11), (12), (13) or (14).

$$s_{final} = s_{Xaggregate-classX} \quad (8)$$

$$s_{final} = s_{1-class1} + s_{2-class2} + \ldots + s_{Xaggregate-classX} \quad (9)$$

$$s_{final} = \text{avg}(s_{1-class1} + s_{2-class2} + \ldots + s_{Xaggregate-classX}) \quad (10)$$

$$s_{final} = (w_1 \cdot s_{1-class1}) + (w_2 \cdot s_{2-class2}) + \ldots + (w_X \cdot s_{Xaggregate-classX}) \quad (11)$$

$$s_{final} = s_{1aggregate-class1} + s_{2aggregate-class2} + \ldots + s_{Xaggregare-classX} \quad (12)$$

$$s_{final} = \text{avg}(s_{1aggregate-class1} + s_{2aggregate-class2} + \ldots + s_{Xaggregare-classX}) \quad (13)$$

$$s_{final} = (w_1 \cdot s_{1aggregate-class1}) + (w_2 \cdot s_{2aggregate-class2}) + \ldots + (w_X \cdot s_{Xaggregate-classX}) \quad (14)$$

where $s_{1aggregate-class1}$ represents an aggregate quality score for a first class, $s_{2aggregate-class2}$ represents an aggregate quality score for a second class.

Once the final quality score $s_{final}$ for the given candidate trajectory has been generated, method 600 may return to 606 so that the process is repeated for a next candidate vehicle trajectory as shown by optional 624. In 626, a candidate vehicle trajectory is selected based on the final quality score(s) representing the quality of the candidate vehicle trajectory(ies). For example, the candidate vehicle trajectory with the highest or lowest final quality score is selected in 616. Alternatively or additionally, the candidate vehicle trajectory is selected as the one with the quality score that is greater than or less than a given threshold. If two or more candidate vehicle trajectories have a quality score that is greater than or less than the given threshold, then the candidate vehicle trajectory is selected as the one with the greatest or lowest quality score. A linear/non-linear function could be used to selected the candidate vehicle trajectory based on the final quality scores. Subsequently, 628 is performed where method 600 ends or other operations are performed. For example, the computing device may consider the selected candidate vehicle trajectory as a high quality vehicle trajectory, and therefore perform operations to cause the AV to follow the same (e.g., provided that there is no risk of collision with an object).

Figure 7:
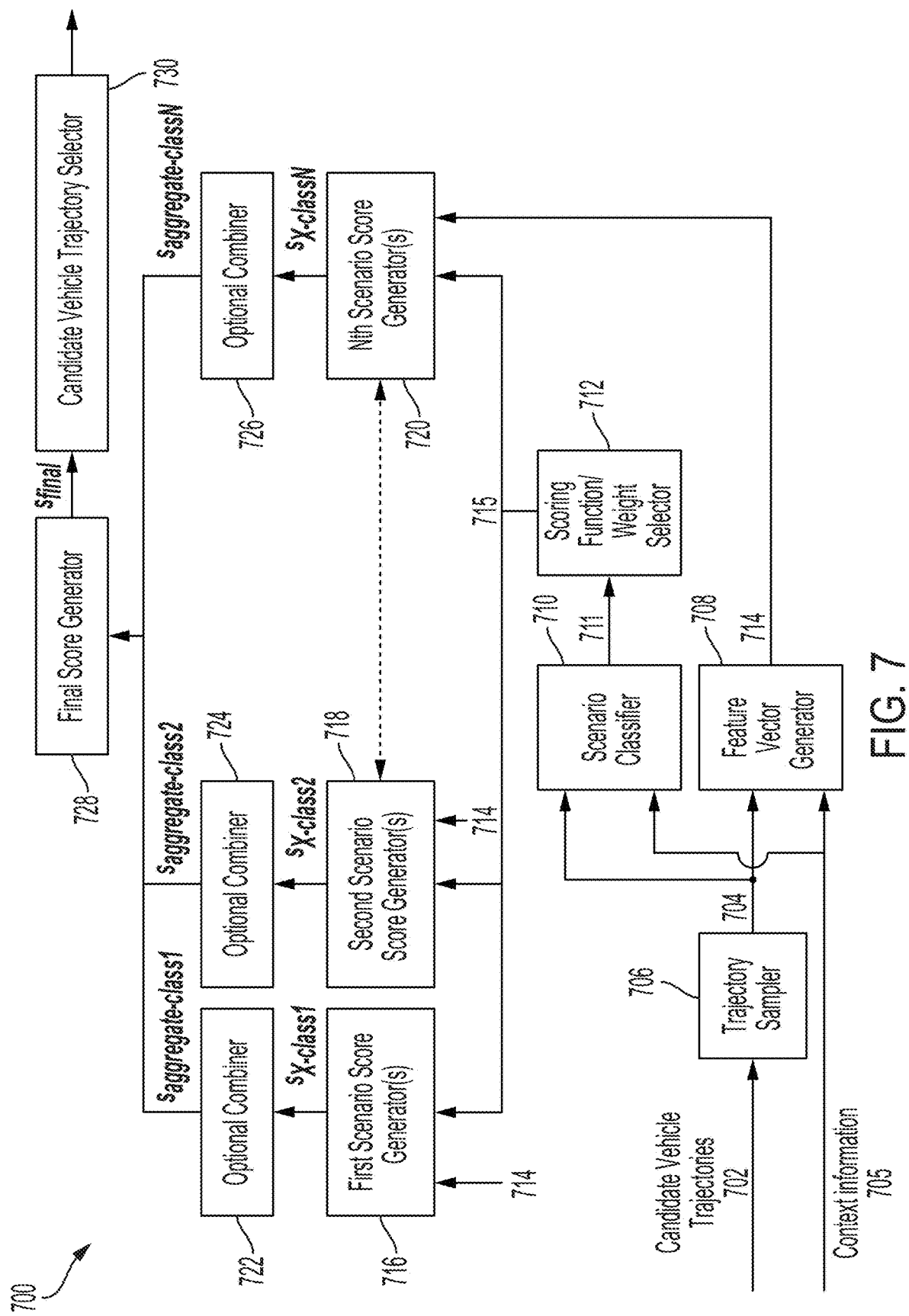
FIG. 7 provides an illustration of an illustrative system architecture implementing the present solution.

Referring now to FIG. 7, there is provided a schematic illustration of an illustrative system architecture 700 for implementing the present solution (e.g., method 600 of FIG. 6). System 700 may be implemented in hardware, software or a combination thereof.

As shown in FIG. 7, system 700 comprises a trajectory sampler 706, a feature vector generator 708, a scenario classifier 710, a scoring function/weight selector 712, score generators 716, 718, . . . , 720, optional combiners 722, 724, . . . , 726, a final score generator 728, and a candidate vehicle trajectory selector 730. The trajectory sampler 706 is configured to sample a candidate vehicle trajectory 702 input into system 700. The trajectory sampler 706 can be deterministic or stochastic. The sampled candidate vehicle trajectory 704 is then passed to the scenario classifier 710 and the feature vector generator 708. The scenario classifier 710 is configured to analyze the vehicle trajectory 704 and context information 705 to classify a scenario specified thereby into one or more scenario classes. The scenario classes can include, but are not limited to, a left turn scenario class, a right turn scenario, a passing scenario class, and/or a passenger pick-up scenario class. In some scenarios, the scenario classifier 710 employs a machine learning algorithm in which machine learned models are used to determine scenario classifications. In those or other scenarios, the scenario classifier 710 uses pre-defined classification criteria to determine scenario classifications.

The scenario classification(s) 711 is(are) passes to the scoring function/weight selector 712. Based on the scenario classification(s), the scoring function/weight selector 712 selects (i) a scoring function from a plurality of different scoring functions $SF_1$, $SF_2$, . . . , $SF_N$, (ii) a set of scoring functions from a plurality of different sets (e.g., $ST_1=[SF_1, SF_2, SF_{10}]$, $ST_2=[SF_2, SF_5, SF_{10}, SF_N]$ and/or $ST_3=[SF_6, SF_8]$, and/or (iii) weights $w_Z$ for the at least one scoring function. The scoring functions can include, but are not limited to, a linear regression function, a non-linear regression function, a Quadratic function features in feature vector, and/or a polynomial function of features in feature vector. A control signal 715 is then sent from the scoring function/weight selector 712 to the score generator(s) associated with the selected scoring function(s) or the selected set of scoring functions. The control signal 715 causes an enablement of the selected scoring function generator(s) or scoring function(s) of the selected set. The control signal 715 may also specify selected weights that are to be used by the scoring function(s).

When enabled, a scoring function generator 716, 718, 720 processes a feature vector 714 to generate one or more quality scores for a given scenario classification associated with the given candidate vehicle trajectory 704. For example, score generator(s) 716 generate(s) quality score(s) $s_{X-class1}$ for a first scenario associated with the given candidate vehicle trajectory 704. Score generator 718 generate(s) quality score(s) $s_{X-class2}$ for a second scenario associated with the given candidate vehicle trajectory 704. Score generator 720 generate(s) quality score(s) $s_{X-classN}$ for an $N^{th}$ scenario associated with the given candidate vehicle trajectory 704. The present solution is not limited to the particulars of this example. The same or different score generator(s) 716, 718, 720 can be enabled for different candidate vehicle trajectories.

The quality scores are output from the score generator(s) 716, 718, 720, and passed to optional combiner(s) 722, 724, 726 and/or final score generator 728. Each combiner 722, 724, 726 is configured to produce an aggregate quality score for a respective scenario. For example, combiner 722 is configured to combine the quality scores output from the first scenario score generator(s) 716 to produce an aggregated quality score $s_{aggregate-class1}$. Combiner 724 is configured to combine the quality scores output from the second scenario score generator(s) 718 to produce an aggregated quality score $s_{aggregate-class2}$. Combiner 726 is configured to combine the scores output from the $N^{th}$ scenario score generator(s) 720 to produce an aggregated quality score $s_{aggregate-classN}$.

The quality score(s) output from the score generator(s) 716-720 and/or the quality aggregated score(s) output from the combiner(s) 722-726 is(are) passed to the final score generator 728. The final score generator 728 determines a final quality score $s_{final}$ based on the received quality score(s) and/or aggregated quality score(s). The final quality score $s_{final}$ is then passed to the candidate vehicle trajectory selector 730. The operations of blocks 706-728 are performed for each candidate vehicle trajectory contained in the candidate vehicle trajectories 702.

The final quality scores are then used by the candidate vehicle trajectory selector 730 to select a candidate vehicle trajectory from the candidate vehicle trajectories 702. For example, the candidate vehicle trajectory with the highest or lowest final quality score is selected by the candidate vehicle trajectory selector 730. Alternatively or additionally, the candidate vehicle trajectory is selected by the candidate vehicle trajectory selector 730 as the one with the quality score that is greater than or less than a given threshold. If two or more candidate vehicle trajectories have a quality score that is greater than or less than the given threshold, then the candidate vehicle trajectory is selected by the candidate vehicle trajectory selector 730 as the one with the greatest or lowest quality score. A linear/non-linear function could be used by the candidate vehicle trajectory selector 730 to select the candidate vehicle trajectory based on the final quality scores.

As evident from the above discussion, the present solution may utilize a scenario classifier and an aggregator for trajectory scoring, which introduces more structure and transparency to a scoring calculation. The present solution may use multiple scoring functions with the same and/or different types of scenarios. The present solution has many advantages. For example, the present solution is relatively easy to tune to focus on particular scenario(s). The present solution also enables parallelism in development where each team member can tune part of the scoring function in parallel. Use of the scenario classifier reduces the required complexity of the feature vector generator.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating an autonomous vehicle, comprising:
    obtaining, by a computing device, one or more candidate vehicle trajectories for the autonomous vehicle and context information defining a state of an environment surrounding the autonomous vehicle;
    classifying, by the computing device, a context into at least one scenario class of a plurality of different scenario classes based on the context information and a first candidate vehicle trajectory of the candidate vehicle trajectories, the context being classified into a first scenario class and a second scenario class;
    selecting, by the computing device for a scenario class among the at least one scenario class into which the context was classified, a set of scoring functions from a plurality of different sets of scoring functions for the first scenario class and one scoring function for the second scenario class, the plurality of different sets of scoring functions being respectively associated with the plurality of different scenario classes, and the set of scoring functions including a plurality of scoring functions for the scenario class;
    generating, by the computing device, a plurality of scores using the set of scoring functions for the first scenario class;
    combining, by the computing device, the plurality of scores by performing a summation of the plurality of scores to obtain a first scenario score for the first scenario class;
    generating, by the computing device, a second scenario score for the second scenario class using the one scoring function;
    generating, by the computing device, a first quality score for the first candidate vehicle trajectory by combining the first scenario score and the second scenario score;
    selecting, by the computing device, a candidate vehicle trajectory from the candidate vehicle trajectories based on the first quality score associated with the first candidate vehicle trajectory and a second quality score associated with a second candidate vehicle trajectory; and
    causing, by the computing device, the autonomous vehicle to perform autonomous driving operations using the selected candidate vehicle trajectory.

2. The method according to claim 1, wherein the context information comprises at least one of intersection information, object related information, a road map, traffic information, and environmental information.

3. The method according to claim 1, further comprising performing operations, by the computing device, to (i) generate a feature vector using the context information and the first candidate vehicle trajectory of the candidate vehicle trajectories and (ii) use the feature vector to generate the quality score for the first candidate vehicle trajectory.

4. The method according to claim 1, wherein
    the context is classified into a first scenario class and a second scenario class,
    the set of scoring functions is selected for the first scenario class,
    the method further comprising selecting one scoring function from among of a plurality of scoring functions based on the second scenario class, wherein:
    a first scenario score is generated using the set of scoring functions for the first scenario class and a second scenario score is generated using the one scoring function for the second scenario class, and the first scenario score and the second scenario score are combined together to produce the first quality score for the first candidate vehicle trajectory.

5. The method according to claim 1, wherein the plurality of different scenarios classes further comprise at least one of a passing scenario class, an acceleration scenario class, a deceleration scenario class, a stationary scenario class, a forward driving scenario class, a reverse driving scenario class, and/or a passenger pick-up scenario class.

6. The method according to claim 1, wherein the candidate vehicle trajectory is selected from the candidate vehicle trajectories by comparing the first and second quality scores to each other or to a threshold value.

7. The method according to claim 1, wherein the autonomous driving operations comprise causing the autonomous vehicle to follow the selected candidate vehicle trajectory.

8. A system, comprising:
a processor;
a non-transitory computer-readable storage medium comprising programming instructions that are configured to cause the processor to implement a method for operating an autonomous vehicle, wherein the programming instructions comprise instructions to:
obtain one or more candidate vehicle trajectories for the autonomous vehicle and context information defining a state of an environment surrounding the autonomous vehicle;
classify a context into at least one scenario class of a plurality of different scenario classes based on the context information and a first candidate vehicle trajectory of the candidate vehicle trajectories, the context being classified into a first scenario class and a second scenario class;
select a set of scoring functions from a plurality of different sets of scoring functions for the first scenario class and one scoring function for the second scenario class, the plurality of different sets of scoring functions being respectively associated with the plurality of different scenario classes, and the set of scoring functions including a plurality of scoring functions;
generate a plurality of scores using the set of scoring functions for the first scenario class;
combine the plurality of scores for the scenario class to obtain a first scenario score for the first scenario class by performing a summation of the plurality of scores;
generate a second scenario score for the second scenario class using the one scoring function;
generate at least one first quality score for the first candidate vehicle trajectory by combining the first scenario score and the second scenario score;
select candidate vehicle trajectory from the candidate vehicle trajectories based on the first quality score associated with the first candidate vehicle trajectory and a second quality score associated with at least one second candidate vehicle trajectory; and
cause the autonomous vehicle to perform autonomous driving operations using the selected candidate vehicle trajectory.

9. The system according to claim 8, wherein the context information comprises at least one of intersection information, object related information, a road map, traffic information, and environmental information.

10. The system according to claim 8, wherein the programming instructions further comprise instructions to (i) generate a feature vector using the context information and the first candidate vehicle trajectory of the candidate vehicle trajectories and (ii) use the feature vector to generate the quality score for the first candidate vehicle trajectory.

11. The system according to claim 8, wherein the plurality of different scenario classes comprise at least one of a left turn scenario class, a right turn scenario, a passing scenario class, a driving scenario class, an acceleration scenario class, a deceleration scenario class, a stationary scenario class, a forward driving scenario class, a reverse driving scenario class, and/or a passenger pick-up scenario class.

12. The system according to claim 8, wherein the candidate vehicle trajectory is selected from the candidate vehicle trajectories by comparing the first and second quality scores to each other or to a threshold value.

13. The system according to claim 8, wherein the autonomous driving operations comprise causing the autonomous vehicle to follow the selected candidate vehicle trajectory.

14. A non-transitory computer-readable medium that stores instructions that, when executed by at least one computing device, will cause the at least one computing device to perform operations comprising:
obtaining, by a computing device, one or more candidate vehicle trajectories for an autonomous vehicle and context information defining a state of an environment surrounding the autonomous vehicle;
classifying, by the computing device, a context into at least one scenario class of a plurality of different scenario classes based on the context information and a first candidate vehicle trajectory of the candidate vehicle trajectories, the context being classified into a first scenario class and a second scenario class;
selecting, by the computing device for a scenario class among the at least one scenario class into which the context was classified, a set of scoring functions from a plurality of different sets of scoring functions for the first scenario class and one scoring function for the second scenario class, the plurality of different sets of scoring functions being respectively associated with the plurality of different scenario classes, and the set of scoring functions including a plurality of scoring functions for the scenario class;
generating, by the computing device, a plurality of scores using the set of scoring functions for the first scenario class;
combining, by the computing device, the plurality of scores to obtain a first scenario score for the first scenario class by performing a summation of the plurality of scores;
generating, by the computing device, a second scenario score for the second scenario class using the one scoring function;
generating, by the computing device, a first quality score for the first candidate vehicle trajectory by combining the first scenario score and the second scenario score;
selecting, by the computing device, a candidate vehicle trajectory from the candidate vehicle trajectories based on the first quality score associated with the first candidate vehicle trajectory and a second quality score associated with at least one second candidate vehicle trajectory; and
causing, by the computing device, the autonomous vehicle to perform autonomous driving operations using the selected candidate vehicle trajectory.

15. The method of claim 1, wherein the plurality of scoring functions comprise a linear regression function, a non-linear regression function, a Quadratic function features in feature vector, and a polynomial function of features in feature vector.

* * * * *